United States Patent
Timmermans et al.

(10) Patent No.: US 7,549,696 B1
(45) Date of Patent: Jun. 23, 2009

(54) BUS SIDE WALL CONSTRUCTION

(75) Inventors: Jos Timmermans, Ortonville, MI (US);
Jean Raymond, Nominique (CA);
Norm Haustein, Naples, FL (US)

(73) Assignee: Altair Engineering, Inc., Troy, MI (US)

( * ) Notice: Subject to any disclaimer, the term of this patent is extended or adjusted under 35 U.S.C. 154(b) by 8 days.

(21) Appl. No.: 11/595,153

(22) Filed: Nov. 9, 2006

Related U.S. Application Data (60) Provisional application No. 60/735,029, filed on Nov. 9, 2005.

(51) Int. Cl.
*B62D 25/02* (2006.01)

(52) U.S. Cl. .................................. 296/203.03; 296/178

(58) Field of Classification Search ................. 296/178, 296/181.6, 179, 187.01, 203.01, 203.05, 296/203.03
See application file for complete search history.

(56) References Cited

U.S. PATENT DOCUMENTS

| | | | |
|---|---|---|---|
| 2,239,089 A | 4/1941 | Fageol | |
| 3,186,755 A | 6/1965 | Ward | |
| 3,794,373 A * | 2/1974 | Manning | ..................... 296/178 |
| 3,827,137 A * | 8/1974 | Schubach | ..................... 29/469 |
| 3,881,765 A | 5/1975 | Cerra et al. | |
| 4,033,033 A | 7/1977 | Heffner | |
| 4,203,623 A * | 5/1980 | Fenner et al. | ................ 296/178 |
| 4,254,987 A | 3/1981 | Leonardis | |
| 4,274,190 A * | 6/1981 | Slattery | ..................... 29/401.1 |
| 4,358,914 A | 11/1982 | Geyer | |
| 4,469,369 A | 9/1984 | Belik et al. | |
| 4,773,701 A | 9/1988 | Messori | |
| 5,131,714 A | 7/1992 | Evans, Sr. et al. | |
| 5,188,195 A | 2/1993 | Haustein | |
| 5,577,793 A | 11/1996 | Kobasic | |
| 5,934,739 A | 8/1999 | Waldeck | |
| 6,007,123 A | 12/1999 | Schwartz et al. | |
| 6,183,034 B1 | 2/2001 | Moody et al. | |
| 6,602,141 B2 | 8/2003 | Timmermans et al. | |
| 6,685,254 B2 | 2/2004 | Emmons et al. | |
| 6,726,271 B2 * | 4/2004 | Stanton et al. | ......... 296/146.15 |
| 7,305,766 B1 | 12/2007 | Timmermans | |

FOREIGN PATENT DOCUMENTS

NL      8602834      6/1988

OTHER PUBLICATIONS

Paul Dvorak, FEA and optimization leads to a more efficient design process, Oct. 11, 2001, Machine Design, pp. 55-56.

* cited by examiner

*Primary Examiner*—Dennis H. Pedder
*Assistant Examiner*—Melissa A Black
(74) *Attorney, Agent, or Firm*—Young Basile (57) ABSTRACT

A bus side wall construction includes a skeletal member formed by a plurality of metallic members welded together and a plurality of window assemblies. The metallic members include a longitudinal roof member, a longitudinal lower member, a longitudinal upper member and a longitudinal waist member disposed between the longitudinal upper and lower members. Spaced vertical tubular members extend from the longitudinal waist member. Cross orientated tubular truss members extend between the longitudinal waist member and the longitudinal lower member. The window assemblies are positioned above the longitudinal waist member and supported by the vertical tubular members. An outer and inner skin covers the skeletal member from the longitudinal waist member and the longitudinal lower member. Insulation members are secured between the inner and outer skins.

12 Claims, 7 Drawing Sheets

BUS SIDE WALL CONSTRUCTION

This application claims priority of Provisional Patent Application S. N. 60/735,029 filed on Nov. 9, 2005, which is hereby incorporated by reference in its entirety.

BACKGROUND

This invention relates to bus construction and more particularly to an improved bus sidewall construction.

Previous bus construction included a skeletal member formed by welding columns and beams together. The skeletal member is then covered on the inside and the outside with a sheet metal having an insulation filled between the two sets of sheet metal. The insulation is usually a fiber material or other insulating material. In the event of an accident where the side construction is bent, repair to the skeletal structure is difficult and expensive.

It is therefore desirable to provide a structural side wall member which is simple and cost efficient to construct and yet provides high buckling strength in the event of a sidewall collision.

SUMMARY

A sidewall construction for a bus is provided having a skeletal structure including a plurality of welded together metallic members and a plurality of window assemblies. The metallic members include a roof member, a horizontal longitudinal member, and a waist longitudinal tubular member horizontally disposed in a middle portion between the roof member and the lower longitudinal member. Spaced vertical tubular pillars extend from the waist longitudinal tubular member to the roof member.

A plurality of diagonal tubular truss members are arranged in a cross configuration and extend between the waist longitudinal tubular member and the lower longitudinal member.

In another aspect of the invention, the sidewall construction further includes inner skin members and an outer skin member that enclose the skeletal structure. A plurality of insulation members are secured therebetween.

In yet another aspect of the invention of the sidewall construction each window assembly includes a glass pane, a frame, and a pivot member. Each pivot member has a lower socket portion and an upper arcuate pivot portion. The lower socket portion is fitted over and adhesively secured to an upper edge of a pane. The upper, arcuate pivot portion of the pivot member is received in an elongated extrusion member that extends along an upper side of the bus and is supported by the roof member. Each window assembly can selectively move between a lowered or closed position and a raised or open position.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Referring to the FIGS. 1-13, the bus 10 of the invention includes, in a known manner front steering wheels 11, rear drive wheels 12, and a main body structure 13 incorporating a roof and side wall construction 14 and a front end 15 including a front door assembly 16. The roof and side window construction 14 includes a frame or skeletal structure 17, and a plurality of window assemblies 18 (FIG. 8) arranged in side by side relation along each side of the vehicle.

Skeletal structure 17 comprises a plurality of welded together metallic members and, specifically, includes a roof longitudinal tubular member 22, an upper longitudinal tubular member 24, a waist longitudinal tubular member 26, an angle longitudinal member 28, a lower longitudinal tubular member 30, vertical tubular pillars 32, and a plurality of diagonal tubular truss members 34 arranged in crossed fashion.

Figure 1:
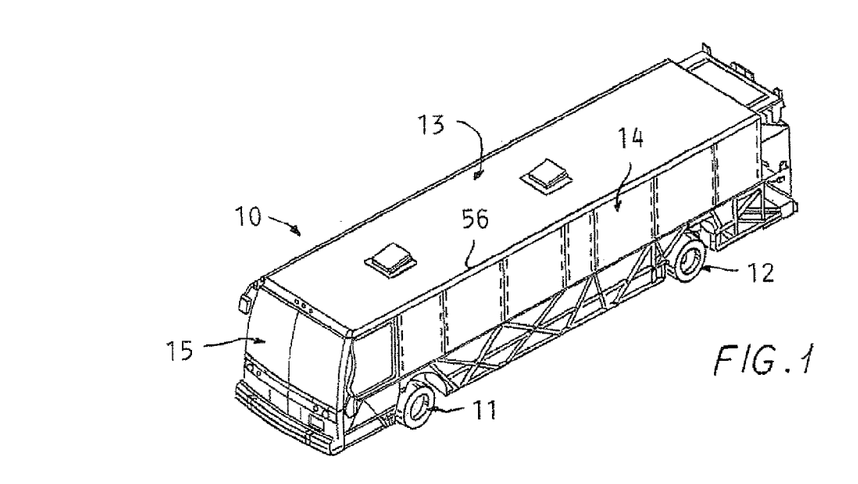
FIG. 1 is a perspective view of a bus according to the invention viewed from streetside.
Figure 2:
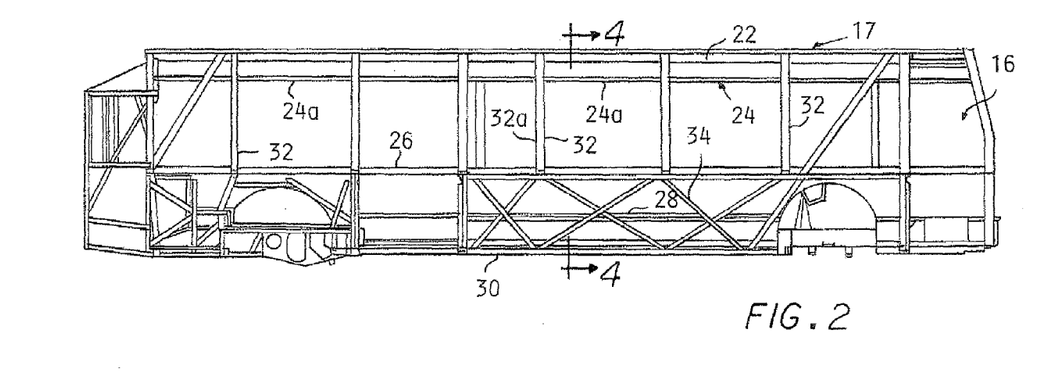
FIG. 2 is a side view of the bus in skeletal form viewed from curbside.
Figures 2A, 2B:
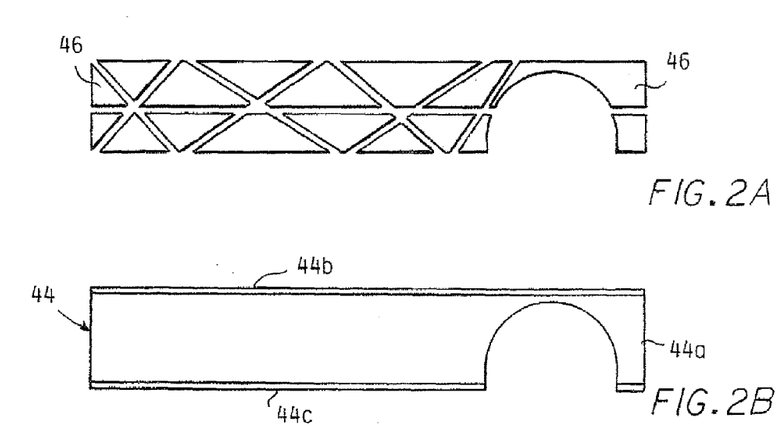
FIGS. 2a, 2b and 2c are fragmentary views amplifying certain components shown in FIG. 2.
Figure 2C:
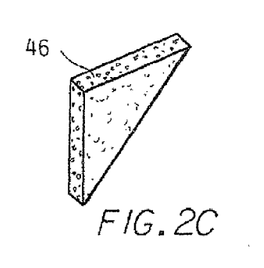
Figure 3:
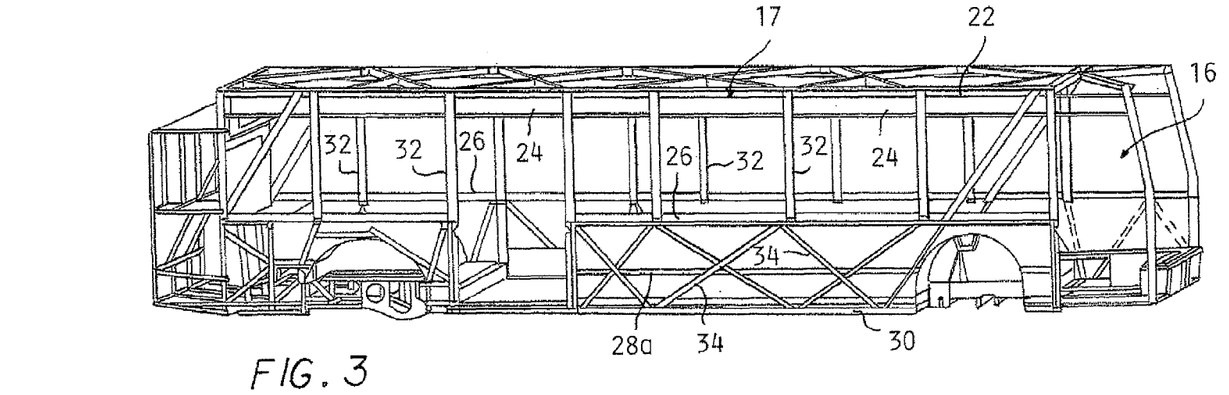
FIG. 3 is a perspective skeletal view of the bus viewed from curbside.
Figures 4, 4A:
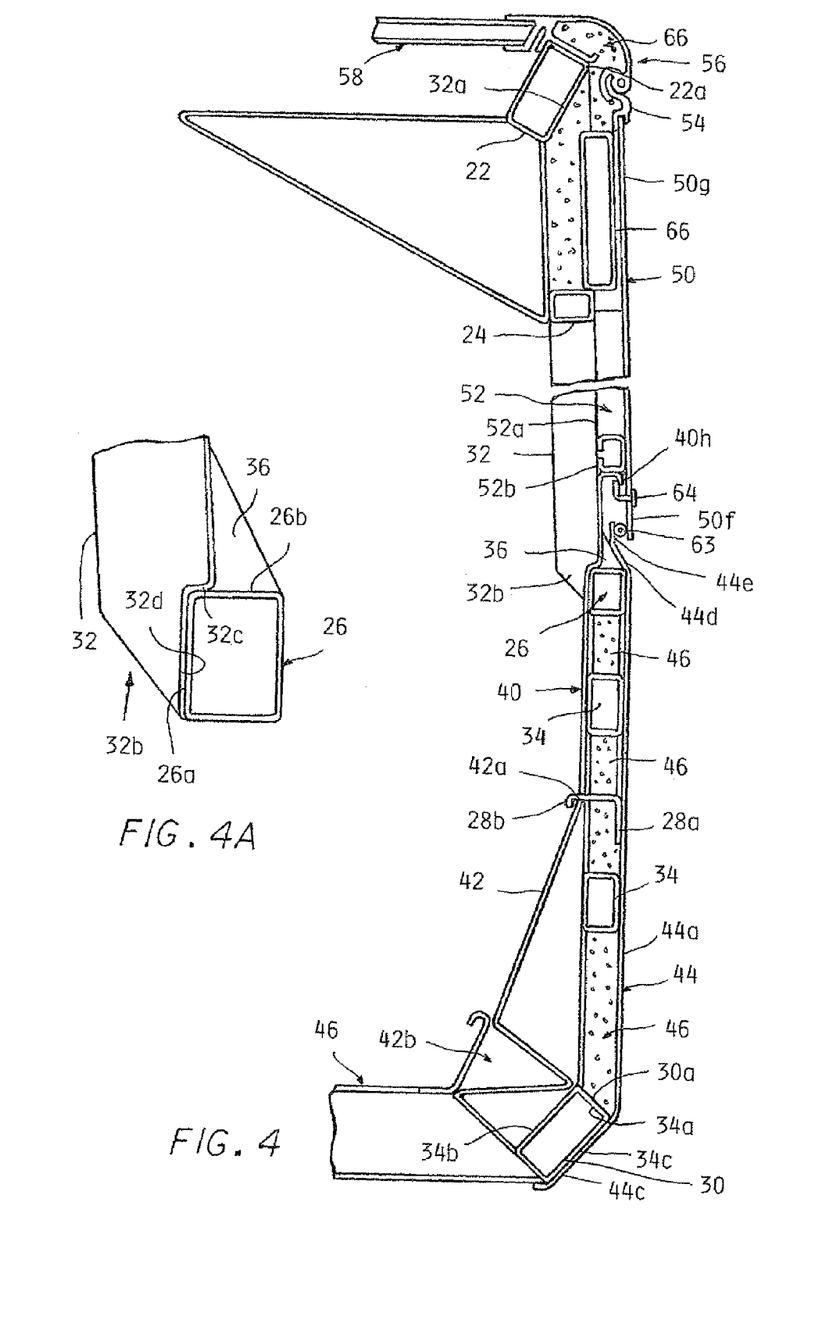
FIG. 4 is a cross-sectional view taken on line 4-4 of FIG. 2.
FIG. 4a is a fragmentary view amplifying certain components shown in FIG. 4.
Figure 5:
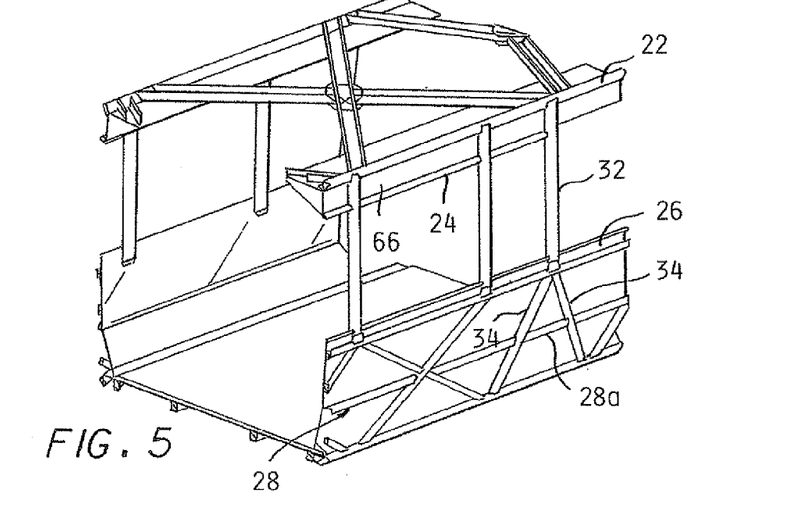
FIG. 5 is a perspective fragmentary skeletal view of the bus.
Figure 6:
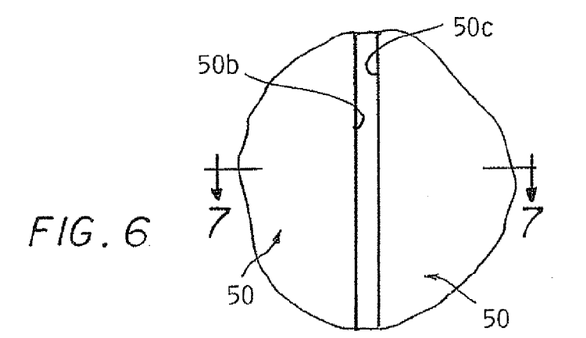
FIG. 6 is a fragmentary view showing certain details of a side window assembly.
Figure 7:
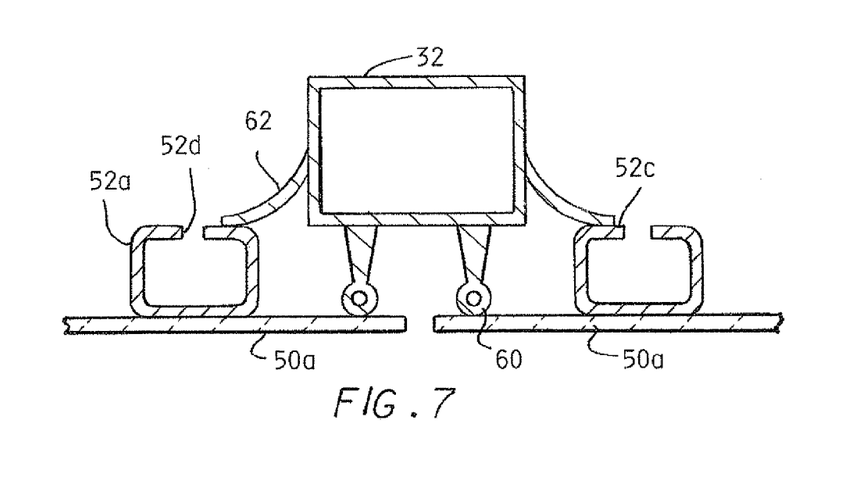
FIG. 7 is a cross-sectional view taken on line 7-7 of FIG. 6.

Looking at FIG. 4, the roof member 22 is arranged in a canted fashion and the upper ends 32a of pillars 32 are beveled and welded to a canted lower side face 22a of the roof member. The lower ends 32b of the pillars are beveled and notched at 32c (FIG. 4A) with an outboard face 32d below notch 32c positioned against an inboard face 26a of waist member 26, notch face 32c positioned against the upper face 26b of the waist member, and a reinforcing gusset 36 weldingly secured between the outboard face of the pillar and the upper face of the waist member.

Upper tubular member 24 is constituted by a plurality of tubular member sections 24a extending between respective adjacent pillars 32.

Truss members 34 extend in cross-fashion between waist member 26 and lower member 30. Lower member 30 is canted and the lower ends 34a of truss members 34 are beveled and secured to the upper canted face 30a of the lower member 30.

Angle member 28 is constituted by a plurality of angle member sections 28a extending between respective truss members 34. The inboard edge 28b of each angle member section 28a has a downturn hook configuration and extends inboard with respect to the inboard plane of members 26, 34 and 30.

Sidewall construction 14 further includes inner skin members 40 and 42, an outer skin member 44, and a plurality of insulation members 46.

Figure 9:
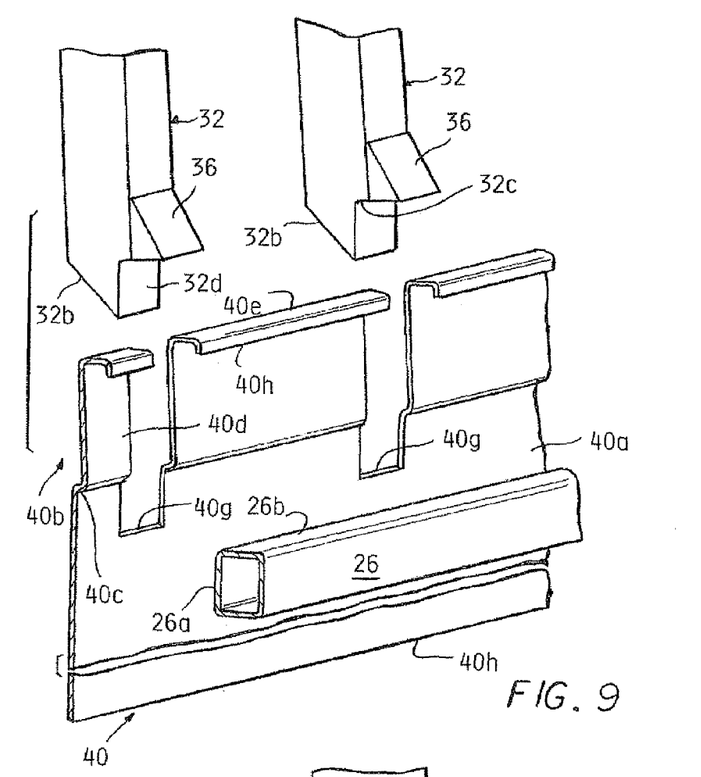
FIGS. 9, 10, 11, 12 and 13 are perspective views illustrating certain details of the sidewall construction.
Figure 10:
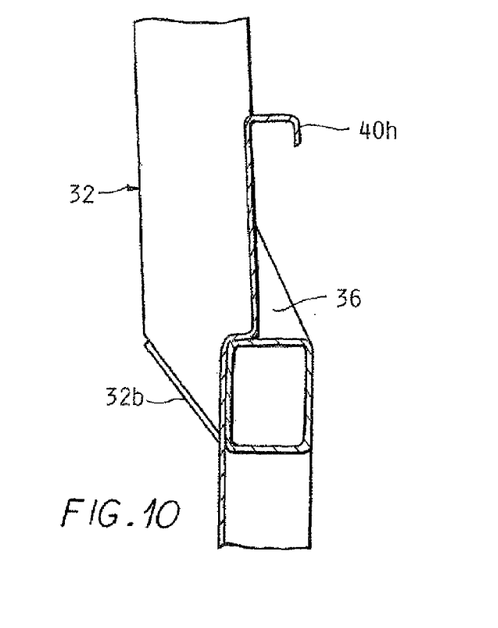
Figure 11:
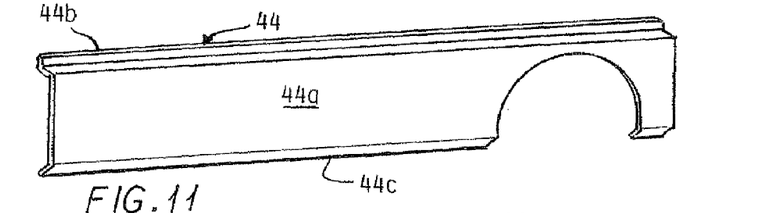
Figure 12:
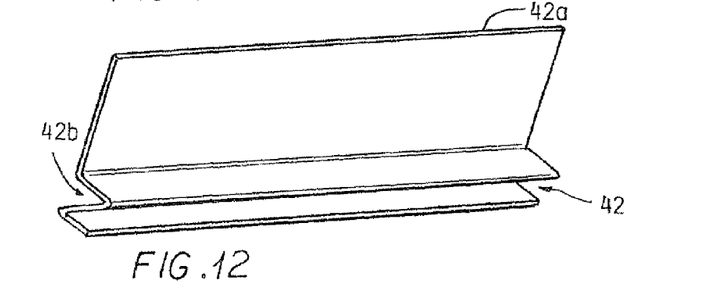

Inner skin 40 has a planar lower main body portion 40a and an upper portion 40b offset outboard with respect to lower portion 40a. Upper portion 40b includes an offset section 40c, a vertical section 40d, an upper horizontal section 40e, and a down turned lip section 40h, as best seen in FIGS. 9 and 10. A plurality of notches 40g are provided at longitudinally spaced locations along skin 40 to accommodate the lower ends of pillars 32 and, specifically, to pass gussets 36, allow access of the pillar faces 32d to the tube inboard faces 26a, and allow the pillar notch faces 32c to access the tube upper face 26b. The lower edge 40h of the inner skin seats against the upper face of the inboard edge 28b of angle member sections 28a.

Inner skin 42 has an upper edge 42a seated against the lower face of the inboard edge 28b of angle member sections 28a and includes a "Z" shaped lower end portion 42b (FIG. 12) seated against the inboard canted face 34b of lower tube 30 and coacting with bus floor members 46.

Outer skin 44 (FIGS. 2B and 11) includes a main body planar portion 44a, an offset upper edge portion 44b, and an angled lower edge portion 44c. Offset upper edge portion 44b includes an inwardly and upwardly angled section 44d terminating in a vertical lip section 44e (FIG. 4). Angled section 44d is positioned against gussets 36 with lip section 44e extending upwardly in general alignment with inner skin lip section 40h. Lower edge portion 44c may be positioned against the canted outboard face 34c of lower tube 34. The outer skin 44 has only one function and that is for the styling of the bus which means that it can be attached and replaced easily since it doesn't have to be watertight. The offset connection at 44 between the upper portion of the skeletal structure of the sidewall and the lower portion of the skeletal structure of the sidewall makes possible a construction including a continuous longitudinal structural member which simplifies fabrication of the sidewall while yet still achieving high buckling strength in a roll-over situation.

Insulation members 46 (FIGS. 2a and 2c) are formed of a suitable thermal and acoustical insulation material and are selectively custom shaped to fit snugly within the respective spaces defined between waist tube 26, lower tube 30, angle member 28, and truss tubes 34. It will be understood that, in the assembled relation of the bus side wall, inner skins 40 and 42 are suitably secured to the inboard faces of the lower region of the skeletal structure, outer skin 44 is suitably secured to the outboard faces of the lower region of the skeletal structure, and insulation members 46 are positioned in sandwich fashion between the inner and outer skins in the respective spaces defined within the lower region of the skeletal structure. Insulation members 46 may also, if desired, be secured to the inner and/or the outer skin members. The insulation material is outside of the barrier provided by the inner skin so that it does not have to comply with the regulations for materials inside the passenger compartment, making it possible to use more cost effective materials that can be installed easier and which can more effectively isolate noise and heat.

Each window assembly 18 (FIG. 8) includes a glass pane 50, a frame 52, and a pivot member 54. Each pane 50 has a cross-sectional configuration conforming to the desired cross-sectional configuration of the bus.

Figure 8:
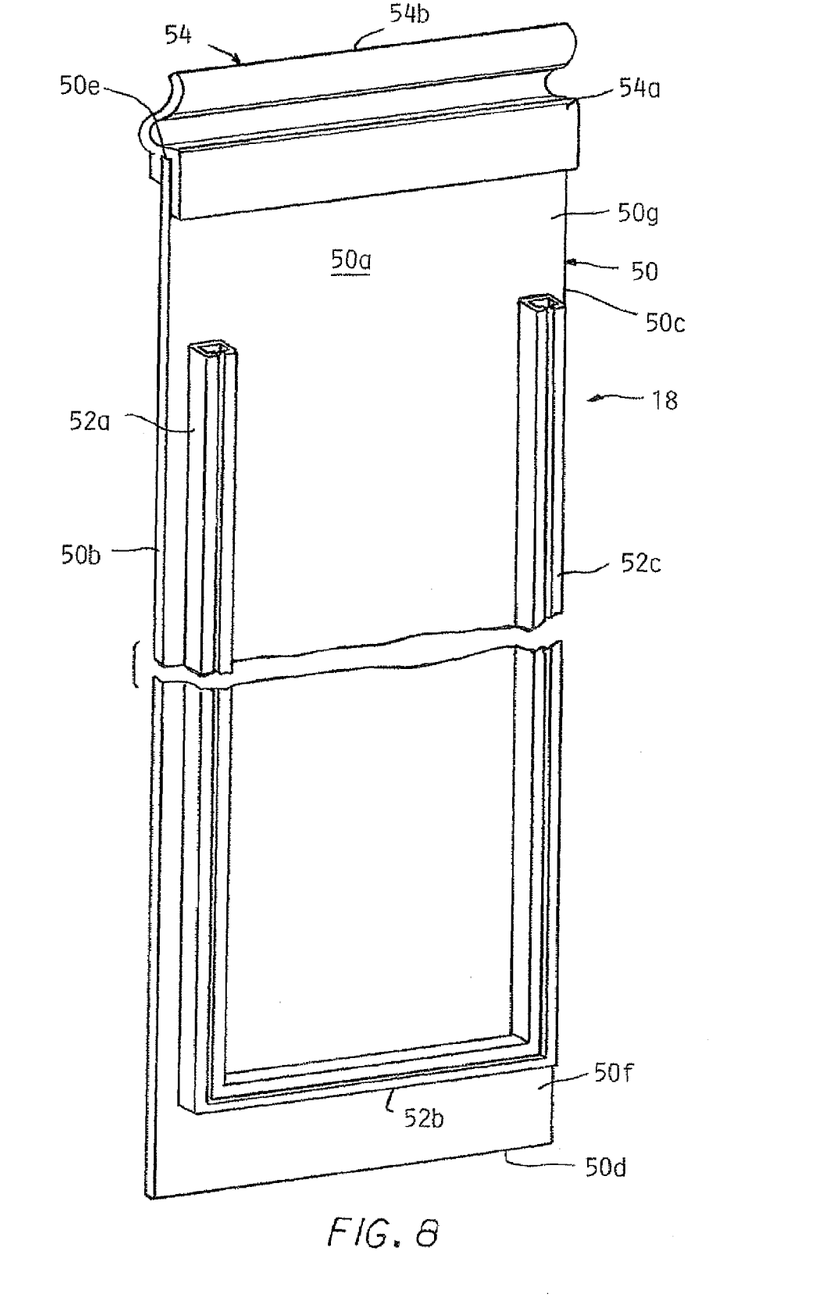
FIG. 8 is a perspective view of a side window assembly.

Each frame 52 has a "U" shaped configuration and is adhesively secured to the inner face 50a of the pane with the individual frame sections 52a, 52b and 52c inwardly spaced relative to the respective side edges 50b, 50c and 50d of the pane and the top of the frame en masse spaced significantly downwardly from the top edge 50e of the pane. The frame sections have a rectangular tubular configuration defining an inboard slit 52d.

Each pivot member 54 includes a lower socket portion 54a fitted over the upper edge 50e of the respective pane and adhesively secured to the pane, and an upper arcuate pivot portion 54b.

Figure 13:
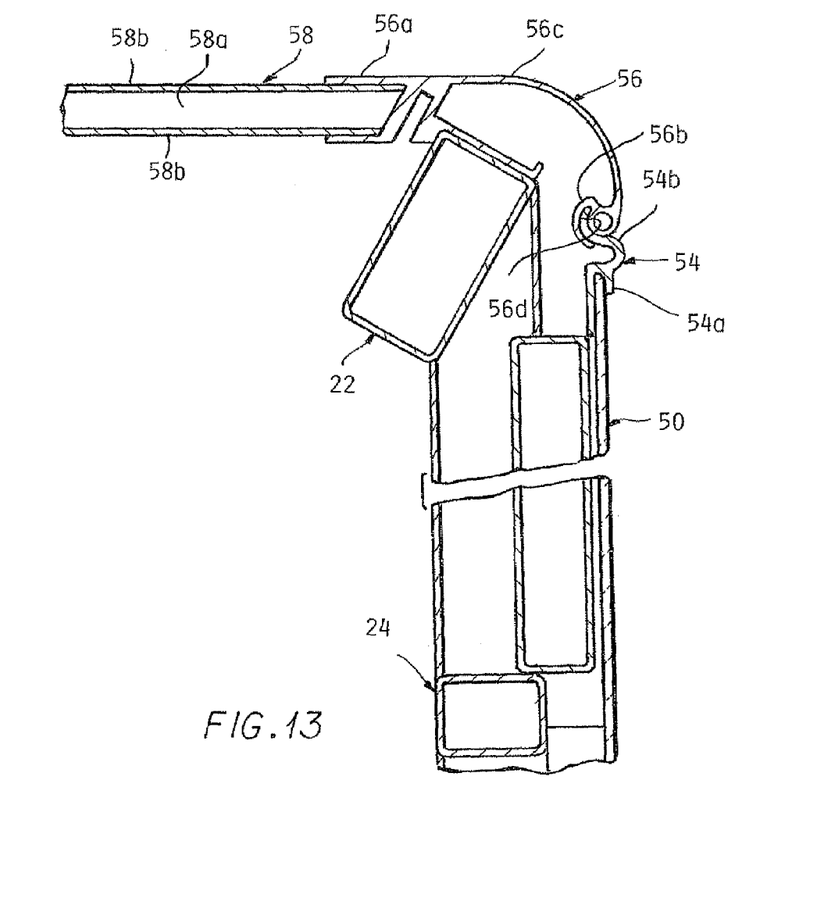

As shown in FIG. 13, successive pivot members 54 are pivotally received in a continuous elongated aluminum extrusion member 56 extending along each upper side of the bus and supported on a respective roof tube 22. Each extrusion member 56 includes an upper socket portion 56a receiving a roof panel 58 forming the roof of the bus, a lower socket portion 56b pivotally receiving the pivot members 54, and an arcuate connector portion 56c. Roof panel 58 has a laminated construction including a central balsa wood core 58a and fiberglass upper and lower sheets 58b. Socket portion 56b defines an arcuate socket 56d receiving the pivot portion 54b of each pivot member 54, whereby the successive window assemblies are pivotally mounted along each side of the bus and may move selectively between lowered or closed positions and raised or open positions.

In their lowered or closed position, a side edge 50b of the pane of one glass assembly is positioned immediately adjacent the side edge 50d of an adjacent window assembly with the lower frame members 52 nesting within and immediately above horizontal sections 40e of inner skin 40 and side frame members 52a and 52c positioned in flanking, but somewhat outboard relation to respective pillars 32. Seals 60 carried by pillars 32 sealingly engage the inboard faces of panes 50 and seals 62 are provided on each pillar 32 for sealing engagement with the respective frame members 52a/52c of the respective window assembly with the window assemblies in their closed positions. The lower edge portion 50f of each pane seats against outer skin lip 44e utilizing a suitable seal 63, and a latch 64 (schematically shown) on lower pane edge portion 50f coacts with lip 40h of the inner skin 40 to latch the window assembly in its closed position.

The spacing of the top of each frame 52 from the upper edge 50e of the glass pane positions the upper ends of the frame members 52a/52c proximate an upper tube member 24 with the window assemblies in their closed positions and a plurality of advertising panels 66 may be positioned above and mounted on the respective tube members 24 in the space immediately behind the upper pane edge portion 50g whereby advertising information on the panels may be viewed through the upper pane edge portion 50g with the windows in their closed positions. The glass assemblies may be moveable between their open and closed positions either manually or with the aid of strut assist devices (not shown). The described window construction also allows ready access to a compartment 66 over the windows within the extrusion member 56, allowing access to wire harnesses, compressed air plumbing and other accessory components positioned within the compartment 66.

Note that in the described sidewall construction the lower portion of the sidewall includes an inner skin on the inboard face of the skeletal structure acting as a barrier between the exterior of the bus and the passenger compartment, and the thermal and acoustical insulation is installed on the outside of this skin in the spaces between the structural tubes of the skeletal structure. This arrangement provides the advantages as stated previously such as:

(a) The outer skin functions as styling for the bus. Therefore, the outer skin can be attached and replaced easily since it doesn't have to be watertight;

(b) The insulation material is outside of the barrier provided by the inner skin so that it does not have to comply with the regulations for materials inside the passenger compartment, making it possible to use more cost effective materials that can be installed easier and which can more effectively isolate noise and heat.

(c) The offset connection between the upper portion of the skeletal structure of the sidewall and the lower portion of the skeletal structure of the sidewall makes possible a construction including a continuous longitudinal structural member which simplifies fabrication of the sidewall while yet still achieving high buckling strength in a roll-over situation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sidewall construction for a bus comprising:
    a skeletal structure including a plurality of welded together metallic members and a plurality of window assemblies, the metallic members including a roof longitudinal member, a lower longitudinal member, a waist longitudinal tubular member horizontally disposed in a middle portion between the roof longitudinal member and the lower longitudinal member, spaced vertical tubular pillars extending from the waist longitudinal tubular member to the roof longitudinal member wherein at least one of the roof longitudinal member and the lower longitudinal member are positioned angularly offset with respect to the position of the waist longitudinal member;
    a plurality of diagonal tubular truss members arranged in a cross configuration and extending between the waist longitudinal tubular member and the lower longitudinal member;
    inner skin members and an outer skin member and a plurality of insulation members secured therebetween, the inner skin member having a planar lower main body portion and an upper portion, the upper portion having an upper vertical section, an upper horizontal section, and an offset section outboard at substantially a 90 degree angle with respect to the lower portion, spaced notches formed in the upper portion from the upper horizontal section through a portion of the offset section, said notches accommodating the lower ends of the pillars.

2. The sidewall construction of claim 1, wherein the lower ends of the pillars have extending angular gussets passing through the notches for access to the waist member.

3. The sidewall construction of claim 1, further comprising an angled member formed by angled member sections extending horizontally between the plurality of diagonal tubular truss members, wherein the inner skin has a lower edge seated against an upper face of an inboard edge of the angled member sections.

4. The sidewall construction of claim 2 wherein the outer skin further comprises a center planar portion, an upwardly angled portion and an angled lower edge portion, said upwardly angled portion terminates at a vertical lip, wherein the upwardly angled portion is positioned against the gussets.

5. The sidewall construction of claim 3 wherein the insulation members are formed of suitable thermal and acoustical insulation material, said insulation members shaped for fitting snugly in the spaces between the waist longitudinal member, the lower longitudinal member, the angled member sections and the plurality of diagonal tubular truss members.

6. A sidewall construction for a bus comprising:
    a skeletal structure including a plurality of welded together metallic members and a plurality of window assemblies, the metallic members including a roof longitudinal member, a lower longitudinal member, a waist longitudinal tubular member horizontally disposed in a middle portion between the roof longitudinal member and the lower longitudinal member, spaced vertical tubular pillars extending from the waist longitudinal tubular member to the roof longitudinal member wherein at least one of the roof longitudinal member and the lower longitudinal member are positioned angularly offset with respect to the position of the waist longitudinal member;
    a plurality of diagonal tubular truss members arranged in a cross configuration and extending between the waist longitudinal tubular member and the lower longitudinal member; and
    an angled member formed by angled member sections extending horizontally between the plurality of diagonal tubular truss members and a lower inner skin, wherein the lower inner skin has an upper edge seated against a lower face of an inboard edge of the angled member sections.

7. A sidewall construction for a bus comprising:
    a skeletal structure including a plurality of welded together metallic members and a plurality of window assemblies, the metallic members including a roof longitudinal member, a lower longitudinal member, a waist longitudinal tubular member horizontally disposed in a middle portion between the roof longitudinal member and the lower longitudinal member, and spaced vertical tubular pillars extending from the waist longitudinal tubular member to the roof longitudinal member;
    a plurality of diagonal truss members arranged in a cross configuration and extending between the waist longitudinal tubular member and the lower longitudinal member;
    an inner skin member having a planar lower main body portion and an upper portion, the upper portion is offset outboard with respect to the lower portion and further includes an offset section, an upper vertical section, an upper horizontal section, spaced notches formed in the upper portion from the upper horizontal section through a portion of the offset section, the notches accommodating respective lower ends of the pillars;
    an outer skin member; and
    a plurality of insulation members secured between the inner skin members and the outer skin member.

8. The sidewall construction of claim 7, wherein the lower ends of the pillars have extending angular gussets passing through the notches for access to the waist member.

9. The sidewall construction of claim 7 further comprising an angled member formed by angled member sections extending horizontally between the plurality of diagonal tubular truss members and a lower inner skin, wherein the lower inner skin has an upper edge seated against a lower face of an inboard edge of the angled member sections.

10. The sidewall construction of claim 8 further comprising an outer skin having a center planar portion, an upwardly angled portion and an angled lower edge portion, said upwardly angled portion terminates at a vertical lip, wherein the upwardly angled portion is positioned against the gussets.

11. The sidewall construction of claim 10 further comprising insulation members formed of suitable thermal and acoustical insulation material, said insulation members shaped for fitting snugly in the spaces between the waist longitudinal member, the lower longitudinal member, the angled member sections and the plurality of diagonal tubular truss members.

12. A sidewall construction for a bus comprising:
    a skeletal structure including a plurality of welded together metallic members and a plurality of window assemblies, the metallic members including a roof longitudinal member, a lower longitudinal member, a waist longitudinal tubular member horizontally disposed in a middle portion between the roof longitudinal member and the lower longitudinal member, and spaced vertical tubular pillars extending from the waist longitudinal tubular member to the roof longitudinal member;

a plurality of diagonal truss members arranged in a cross configuration and extending between the waist longitudinal tubular member and the lower longitudinal member; and an angled member formed by angled member sections extending horizontally between the plurality of diagonal tubular truss members and a lower inner skin, wherein the lower inner skin has an upper edge seated against a lower face of an inboard edge of the angled member sections.

\* \* \* \* \*